(12) United States Patent
Matsui et al.

(10) Patent No.: US 6,712,511 B2
(45) Date of Patent: Mar. 30, 2004

(54) LINEAR MOTION GUIDE UNIT

(75) Inventors: Takeshi Matsui, Kanagawa-ken (JP); Takashi Yatsu, Kanagawa-ken (JP); Shigemasa Itabashi, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 9 days.

(21) Appl. No.: 09/788,346

(22) Filed: Feb. 21, 2001

(65) Prior Publication Data

US 2002/0114544 A1 Aug. 22, 2002

(51) Int. Cl.[7] ................................ F16C 29/06
(52) U.S. Cl. ........................................ 384/45
(58) Field of Search ............................ 384/43, 44, 45, 384/279

(56) References Cited

U.S. PATENT DOCUMENTS

| | | | |
|---|---|---|---|
| 4,637,739 A | | 1/1987 | Hattori |
| 4,648,726 A | * | 3/1987 | Katahira ..................... 384/45 |
| 5,570,958 A | | 11/1996 | Tsukada |
| 5,755,516 A | * | 5/1998 | Teramachi et al. ............ 384/45 |
| 5,800,064 A | * | 9/1998 | Ohya ........................ 384/44 |
| 5,951,168 A | * | 9/1999 | Teramachi et al. ............ 384/45 |
| 5,988,883 A | * | 11/1999 | Takamatu et al. ............. 384/45 |
| 5,993,064 A | * | 11/1999 | Teramachi et al. ............ 384/43 |
| 6,082,899 A | * | 7/2000 | Suzuki et al. ................ 384/45 |
| 6,123,457 A | * | 9/2000 | Suzuki et al. ................ 384/45 |
| 6,126,319 A | * | 10/2000 | Toyota et al. ............... 384/43 |
| 6,176,617 B1 | * | 1/2001 | Kamimura et al. ........... 384/45 |
| 6,190,046 B1 | * | 2/2001 | Agari ........................ 384/43 |

FOREIGN PATENT DOCUMENTS

| | | |
|---|---|---|
| EP | 0 972 960 | 1/2000 |
| JP | 41724/1989 | 3/1989 |
| JP | 54844/1995 | 2/1995 |
| JP | 78032/1998 | 3/1998 |
| JP | 205534/1998 | 8/1998 |

OTHER PUBLICATIONS

Patents Abstract of Japan, Publication No. 11280763, Publication Date Oct. 15, 1999, "Oilless Lubricating Structure of Linear Motion Bearing", Tonogai Mitsuyasu.

Patent Abstracts of Japan, Publication No. 10078032, Publication Date Mar. 24, 1998, "Lubrication Linear Guide Device by Lubricant–Containing Polymer", Tsukada Toru.

* cited by examiner

Primary Examiner—Robert A. Siconolfi
(74) Attorney, Agent, or Firm—Browdy and Neimark, P.L.L.C.

(57) ABSTRACT

A linear motion guide unit is disclosed in which a slider moves relatively of and along a track rail by virtue of rolling elements of balls or rollers. The rolling elements are allowed to recirculate from a load raceway formed between the track rail and the slider to a non-loaded area composed of a turnaround formed in the slider to communicate with the load raceway, and a return passage formed in the slider to communicate with the turnaround. The return passage is encircled with a sintered resinous member of porous texture. Lubricant absorbed and held in voids in the sintered resinous member can be supplied over a prolonged period to the rolling elements, thereby lubricating the rolling elements to make the frictional resistance less, which might be encountered when the slider moves on the track rail, and ultimately helping ensure the improvement in durability.

8 Claims, 8 Drawing Sheets

(A)

(B)

(C)

(D)

(E)

LINEAR MOTION GUIDE UNIT

BACKGROUND OF THE INVENTION

1. Field of the Invention

The present invention relates to a linear motion guide unit comprised of an elongated guide member such as a track rail or a track shaft, and a slider installed on the guide member for linear movement relative to the guide member by virtue of rolling elements.

2. Description of the Prior Art

In the conventional linear motion guide units, the slider is movable relatively of the guide member such as the track rail or track shaft through the rolling elements of balls or rollers, which are allowed to run through recirculating routes comprised of load areas of raceways defined between grooved or flat surfaces formed on the guide member and grooved or flat surfaces formed in the slider and non-loaded areas including turnarounds and return passages in the slider.

To help ensure the rated durability of the linear motion guide units, it is necessary to keep the rolling elements from metal-to-metal direct contact with the guide surfaces. In addition, the rolling elements have to be certainly lubricated with lubricant supplied always to the recirculating routes. Securing lubrication for the recirculating routes is usually realized by replenishing the recirculating routes with oil at regular intervals.

Recently remarkable needs in reduction of expenditure on maintenance activities as well as in energy savings have given birth to various advanced machines and apparatus, which may operate on maintenance-free. Accordingly, the linear motion guide units are also counted on meeting with needs of maintenance-free. Especially, the linear motion guide units expected incorporated in the semiconductor manufacturing equipment, and so on, which conform the clean-room specifications must meet demands to employ the rolling elements and sliders of specific substances and/or designs that might yield debris or cutting as less as possible when making contact rolling or sliding movement. Moreover, it is inevitable to limit the amount of lubricant used as minimum as possible since fine mist of lubricant might contaminates the atmosphere in the clean room.

A prior linear motion guide unit is disclosed in Japanese Utility Model Laid-Open No. 41724/1989, in which a slider has therein recirculating passages allowing balls to run through them, which are made with self-lubricating members. That is, the self-lubricating members such as oilless metals formed in a tube fit in the recirculating passages to lubricate the balls running through the recirculating passages, rendering the application of lubricant on the slider and track rail unnecessary.

Another conventional linear motion guide unit proposed in Japanese Patent Laid-Open No. 54844/1995 has a slider in which lubricant-containing polymer members are arranged to make rolling contact with the rolling elements, ensuring automatic application of lubricant to the rolling elements over a prolonged period use. The lubricant-containing polymer member is manufactured by the steps of melting the mixture of olefinic polymer with poly (α-olefin) oil or the like, pouring the mixture into a mould and solidifying the molded mixture by cooling under pressure.

Disclosed in Japanese Patent Laid-Open No. 78032/1998 is a lubricant-containing polymer member made of lubricant-containing polymer molded integrally with a reinforcing member.

A further another linear motion guide unit disclosed in Japanese Patent Laid-Open No. 205534/1998, which is comprised of a guide rail made on lengthwise sides thereof with raceway grooves, and a slider fitting over the guide rail for sliding movement relatively of the guide rail, the slider being mounted on forward and aft ends with lubricating plates, one to each end, which are made of sintered resinous components impregnated with lubricant to lubricate the raceway grooves along which rolling elements are allowed to run through.

Although but the prior linear motion guide units recited just above can operate successfully with no application of lubricant when used under light loads in the clean room specifications, they do not always serve well for the recently advanced machinery that has become increasingly higher in speed and oscillation. To produce the lubricant-containing polymer member, any polymer should be molded while being mixed with lubricating oil. In addition, the lubricant-containing polymer member has to be reinforced when incorporated really in the linear motion guide units. To cope with these, highly advanced technology is needed. With the construction in which the lubricating plates are mounted on the slider to make sliding engagement with the track rail, the frictional resistance becomes adversely large when it is applied to machinery high in speed and oscillation.

In the linear motion guide unit where the slider can move linearly along the guide rail by virtue of the rolling elements recirculating through the return passages formed in the slider, thus, it may be worthwhile developing a lubricant applicator member arranged in the return passages to apply the lubricant to the rolling elements, which is improved to have sufficient strength in itself and on itself even with no other reinforcement and continue applying the lubricant to the rolling elements to ensure the smooth travel of the rolling elements over the prolonged period.

SUMMARY OF THE INVENTION

The present invention has for its primary object to overcome the problems as described just above, especially provide a linear motion guide unit made free from maintenance such as periodic application and/or suppliance of lubricant: lubricating oil and grease to the guide rail and the rolling elements running through the recirculating route including the guide rail, even under the severe operating conditions in atmosphere and/or subjected load. The linear motion guide unit of the present invention is also less subjected to frictional resistance encountered when the slider moves along the guide rail so that it is well applicable to the high-speed and -oscillation machinery, and makes it possible to realize inexpensive lubrication system.

The present invention is concerned with a linear motion guide unit comprising an elongated guide member, a slider movable lengthwise along the guide member, and rolling elements allowed to run through a recirculating route including a load raceway defined between the guide member and the slider, a turnaround formed in the slider to communicate with the load raceway, and a return passage formed in the slider to communicate with turnaround, wherein the return passage is encircled with a sintered resinous member of porous texture, which can be impregnated with lubricant.

In accordance with an aspect of the present invention, a linear motion guide unit is disclosed wherein the sintered resinous member is made of sintered porous polymer. Moreover, the sintered resinous polymer is produced by filling a preselected mould with powdery ultrahigh molecular weight synthetic resin, and then heating the molded resin under high pressure. This form of production makes it possible to prepare the sintered resinous member inexpensively and in mass-production techniques.

In accordance with another aspect of the present invention, a linear motion guide unit is disclosed wherein the powdery synthetic resin is composed of at least one substance selected from polyethylene, polypropylene and tetrafluoroethylene polymer. The powdery ultrahigh molecular weight polyethylene is a material preferable for producing the molded article with high accuracy and further the resultant sintered resinous members are superior in wear proof.

In accordance with another aspect of the present invention, a linear motion guide unit is disclosed wherein the sintered resinous member is formed in a sleeve, which fits in a bore in the slider to form the return passage.

In accordance with a further another aspect of the present invention, a linear motion guide unit is disclosed wherein the sleeve is made by rolling up a sheet of the sintered resinous member. Alternatively, the sleeve may be made of a pair of halves of the sintered resinous member, which are matched together with each other. Moreover, the sintered resinous member surrounding around the return passage may be made in a block to form a part of the slider. In this later embodiment, the return passage has a diameter enough to allow the rolling elements to run through there while the bore in the slider has a diameter that is determined in consideration of both the diameter of the return passage and the thickness of the sleeve construction. As the sleeve constructions stated earlier can be all formed without using a core, the sintered resinous member can be formed and worked much easier to make it possible to prepare the return passage with ease.

In accordance with another aspect of the present invention, a linear motion guide unit is disclosed wherein the sintered resinous member defining the return passage is provided therein with a lubricant reservoir having any shape selected from a recess, a slit and a groove. The lubricant reservoir in the sintered resinous member makes it easy to hold excess amount of lubricant, which may be supplied little by little over a prolonged period to the rolling elements.

In accordance with another aspect of the present invention, a linear motion guide unit is disclosed wherein the guide member is a track rail made on lengthwise sides thereof with first raceway grooves to provide the load raceways, the slider is formed so as to fit astride over and conform to the track rail for movement relatively of the track rail, the slider being comprised of a casing having second raceway grooves confronting the first raceway grooves to define the load raceways between them, and end caps mounted on forward and aft ends of the casing, and the return passages are formed in the casing while the turnarounds are formed in the end caps. With this linear motion guide unit stated just above, the rolling elements employed are balls.

In another aspect of the present invention, a linear motion guide unit is disclosed wherein the guide member is a track shaft provided on radially opposing sides thereof with lengthwise first raceway grooves, and the slider is formed in a hollow cylinder, which fits over the track shaft for movement relatively of the track shaft, the slider being comprised of a casing having second raceway grooves confronting the first raceway grooves to define the load raceways between them, and end caps mounted on forward and aft ends of the casing, and the return passages are formed in the casing while the turnarounds are formed in the end caps. This modification also uses the rolling elements of balls.

In a further aspect of the present invention, a linear motion guide unit is disclosed wherein the guide member is a track rail made on lengthwise sides thereof with first raceway grooves to provide the load raceways, the slider is comprised of a casing having second raceway grooves confronting the first raceway grooves to define the load raceways between them, and end caps mounted on forward and aft ends of the casing, the rolling elements are rollers, and the return passages are formed in the casing while the turnarounds are formed in the end caps.

With the linear motion guide units constructed as stated earlier, the sintered resinous member has the porous texture capable of keeping the lubricant therein. Thus, the lubricant such as grease, oils, and so on charged once into the sintered resinous member when assembled is absorbed and held in voids in the sintered resinous member, and thereafter supplied continually to the rolling elements running through the return passage.

That is to say, the lubricant in the porous texture of the sintered resinous member is consumed transferred little by little to the rolling elements when making contact with the rolling elements. The lubricant adhered on the rolling elements is then applied to the raceways as the rolling elements run through the raceways. When the rolling elements entraining lubricant thereon run through the load raceways defined between the confronting guide member and slider, lubrication is realized on the load raceways and raceway grooves. The sintered resinous member of porous texture has the property capable of absorbing not only oily content but also other specific contents such as fine powdery solid lubricant, fine powdery coating material and other additives. The sintered resinous member has sufficient strength in itself and on itself even with no other reinforcement. Moreover, the sintered resinous member used in the present invention, as being less subjected to wear, is tough to clogging, which might be caused by cuttings, debris, and so on occurring due to wear, thereby to make it possible to continue applying over a prolonged period the lubricant, which is stored in the porous texture, to the rolling elements. Thus, even under the operating conditions where the atmosphere has a high temperature or the lubricant is extremely less in admitted amount, the sintered resinous member serves well to eliminate the metal-to-metal contact of the rolling elements with the raceways or passages, improving the lubricating property, thereby ultimately increasing the durability of the linear motion guide unit. Alternatively, it is permitted to impregnate the sintered resinous member with lubricant prior to assembling it with the slider.

The linear motion guide unit of the present invention is made free from maintenance such as periodic application and/or suppliance of lubricant, and reduced in frictional resistance encountered at the raceways when the slider moves along the guide member. This improved linear motion guide unit can be even used for the advanced machinery operated on high-speed and-oscillation.

Other aspect and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

BRIEF DESCRIPTION OF THE DRAWING

FIG. 5 is to explain the sintered resinous member used when rolling elements are of rollers, wherein FIG. 5(a) is a cross section and FIG. 5(b) is a side elevation:

DETAILED DESCRIPTION OF THE PREFERRED EMBODIMENTS

Figure 1:
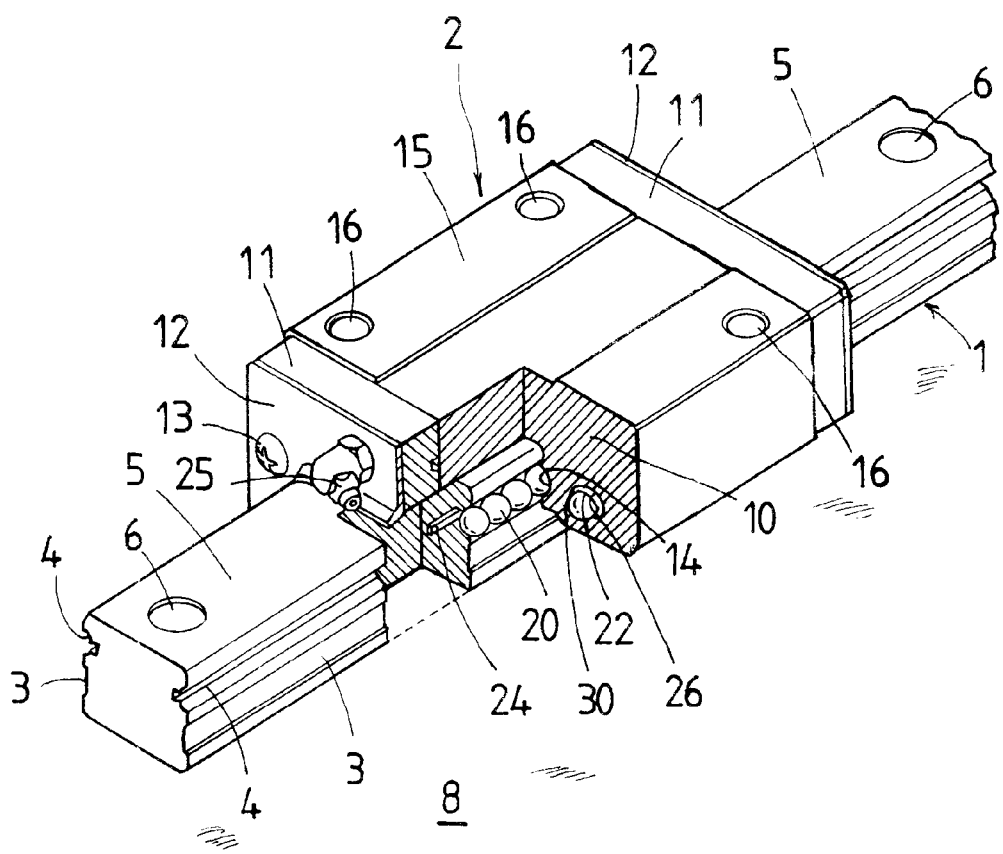
FIG. 1 is a perspective view, partially broken away, showing a preferred embodiment of a linear motion guide unit according to the present invention.
Figure 2:
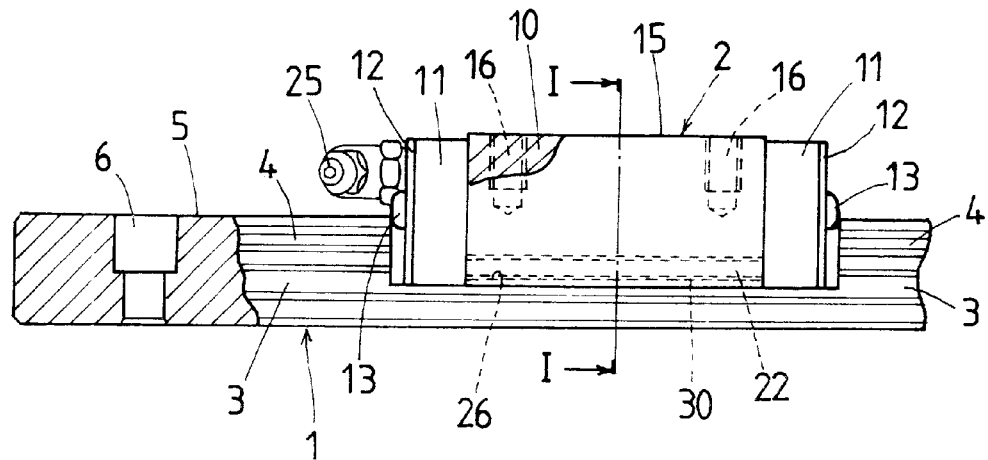
FIG. 2 is a side elevation, partially cut away, showing the linear motion guide unit in FIG. 1.
Figure 3:
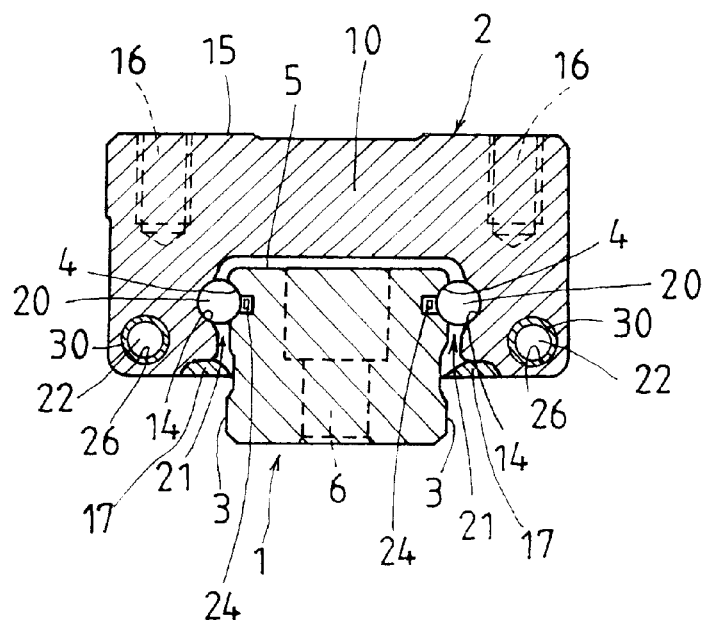
FIG. 3 is a traverse cross section of the linear motion guide unit taken along the line I—I of FIG. 2.

Referring now in detail to the drawings, the linear motion guide unit according to the present invention will be explained below.

Referring first to FIGS. 1 to 4 illustrating a first embodiment of a linear motion guide unit according to the present invention, which is applicable between constructions: machine bed and table confronting each other and movable with respect to one another, the linear motion guide unit is mainly comprised of an elongated track rail 1 having lengthwise-extended first raceway grooves 4 on sides 3 thereof, one raceway groove to each side, and a slider 1 fitting astride over the track rail 2 for sliding movement. The track rail 1 is made on the top 5 thereof with fasten down bolt holes 6, which are used to fasten the track rail 1 to a machine bed 8.

The slider 1 includes a casing 10 of inverted U-shape in traverse section to fit astride over the top 5 of the track rail 1 and conform to track rail 1, end caps 11 attached to forward and aft ends of the casing 10, one to each end, and end seals 12 arranged over end faces of the end caps 11 to cover clearances between the track rail 1 and the end caps 11. Both the end caps 11 and end seals 12 are attached together to the casing 10 with screws 13. The casing 10 is provided with second raceway grooves 14 confronting the first raceway grooves 4 on the track rail 1, and also made with threaded holes 16 open to the top 15 of the casing 10, which are used to connect the slider 2 with a machine table. Bottom seals 17 are arranged at both the bottoms of the casing 10 and end caps 11 to cover clearances between them and the lengthwise sides 3 of the track rail 1.

Rolling elements, or balls 20 are allowed to run through a recirculating route from a load area to a non-loaded area. The load area is comprised of a raceway 21 defined between any first raceway groove 4 on the track rail 1 and the confronting second raceway groove 14 in the casing 2, while the non-loaded area is of turnarounds formed in the end caps to communicate with the associated raceway and a return passage 22 bored in the casing 10 to connected with the associated turnaround. Retainers 24 are to keep the balls 20 against falling off from the casing 10 when the slider 2 is disassembled from the track rail 1. A grease nipple 25 is arranged to any one of the end caps 11 with projecting outwards the associated end seal 12.

It is to be especially noted that the linear motion guide unit of the present invention is characterized in that the return passages 22 in the casing 10 are each comprised of a sleeve of sintered resinous member 30 having porous texture, which can be impregnated with lubricant such as grease, lubricating oil, and so on. The casing 10 is made therein with lengthwise bores 26, each of which is enough in diameter to permit the sleeve of sintered resinous member 30 to be inserted therein. The sleeve is formed so as to provide a linear passage allowing the balls 20 to run therethrough. The sintered resinous members 30 come in abutment at forward and aft ends thereof to the end caps 11 to be kept against lengthwise displacement along the bores 26.

FIG. 4(A) shows a construction of the sintered resinous member 30, which is formed in a straight sleeve defining inside the return passage 22 for allowing the balls 20 to run through there.

FIG. 4(B) illustrates an alternate sintered resinous member 31. In this construction, the first sintered resinous member 30 stated just above is slit at 32 to thereby provide the alternate sintered resinous member 31. The slit 32 serves as a sump for lubricant. Although but a single raw of the slit 32 is shown in the illustrative example, it will be appreciated that any number of the slits may be formed. For example, the lubricant such as grease charged through the grease nipple 25 shortly after assemblage reaches the sintered resinous member 31 and accumulates in the slit 32. Then, the lubricant held in the slit 32 is absorbed in the porous texture of the sintered resinous member 31 to be applied over a prolonged period to the balls 20 running through the return passage 22.

In FIG. 4(C) showing another sintered resinous member 33 formed in a modified sleeve construction, the sintered resinous member 33 is made larger in diameter at lengthwise opposite ends 34 than major middle portion 35 arranged between the enlarged opposite ends 34. In this third construction, since the bore 26 extending lengthwise in the casing 10 is made over all, as shown by dashed lines in FIGS. 2 and 4(C), to accommodate snugly the enlarged ends 34 of the sintered resinous member 33, the major middle portion 35 reduced in diameter can define, in combination with the bore 26, an annular space 37 around the sintered resinous member 33 to provide a lubricant sump where the grease may be stored therein and allowed to flow through a slit 36 into the return passage 22. Thus, the lubricant held in the annular sump 37 continues oozing for a prolonged period through the sintered resinous member 33 to lubricate the balls 20, which run through the return passage 22. This third sintered resinous member 33, as being made less in stiffness at the middle reduced portion 35, is easy to experience elastic deformation, thereby helping ensure the smooth travel of the balls 20.

FIG. 4(D) illustrates a further another sintered resinous member 40 having an alternative sleeve construction. With this fourth construction, the sintered resinous member 40 is enlarged in diameter at lengthwise central rib portion 43 as well as at lengthwise opposite ends 41, 42. Any residual portions 44, 45 disposed between any two adjoining enlarged portions 41, 42, 43 are made reduced in diameter. The reduced portions 44, 45 are made with lengthwise slits 46, 47, one to each portion. The fourth sintered resinous member 34 forms, as with the third sintered resinous member 33 stated earlier, annular spaces 48, 49 in combination with the bore 26 to provide lubricant sumps to hold the grease therein. Although but a single rib portion 43 is illustrated in the illustrative construction, it will be appreciated that any number of the enlarged rib portion 43 may be arranged between the enlarged ends 41, 42 to reinforce the strength that might be made less due to the reduced portions 44, 45. The lubricant in the sumps 48, 49 may be supplied over a prolonged period to the balls 20, which run through the return passage 22.

FIG. 4(E) shows another sintered resinous member 50 having a further modified sleeve construction. In this fifth construction, the sintered resinous member 50 is provided therein with the return passage 22, on the inside periphery of which are formed lengthwise slots 52 arranged spaced apart from each other at an angular interval around the return passage 22 to generate lengthwise projections 51 between the adjacent slots 52 in the form of teeth. With this construction, the lengthwise projections 51 serve as raceways coming in direct contact with the balls 20, while the lengthwise slots 52 come to play the sump to hold the lubricant, which will be impregnated into the sintered resinous member 50. According to the fifth construction stated just above, the sintered resinous member 50 is reduced in areas that might come into contact with the balls 20, compared with other constructions. Thus, the fifth construction promises to lower the frictional resistance encountered when the slider 2 moves along the track rail 1. The lubricant held in the slots 51 is absorbed into the sintered resinous member 50 and later supplied over a prolonged period to the balls 20, which run through the return passage 22.

Figure 4:
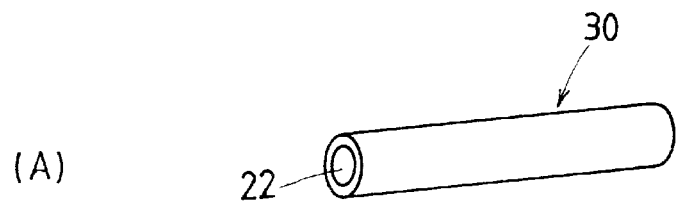
FIG. 4 is perspective views showing sintered resinous members to define return passages in the linear motion guide unit of the present invention, which differ from one another in configuration.
Figure 4:
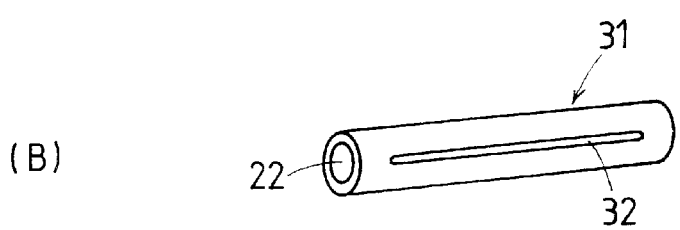
Figure 4:
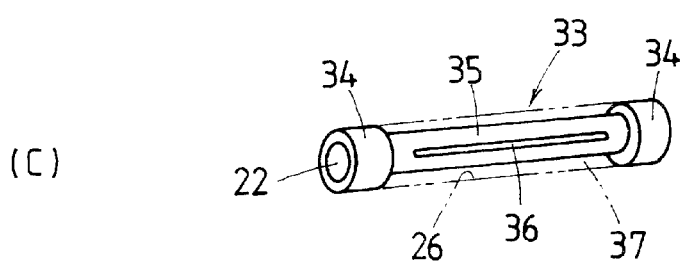
Figure 4:
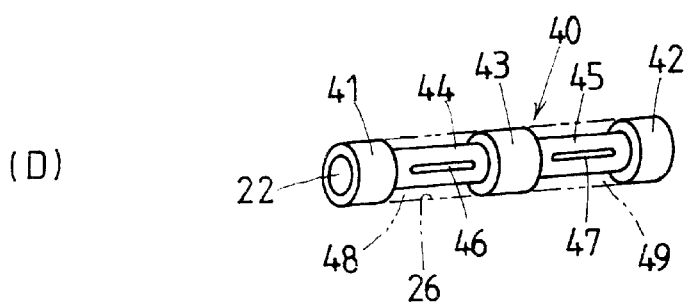
Figure 4:
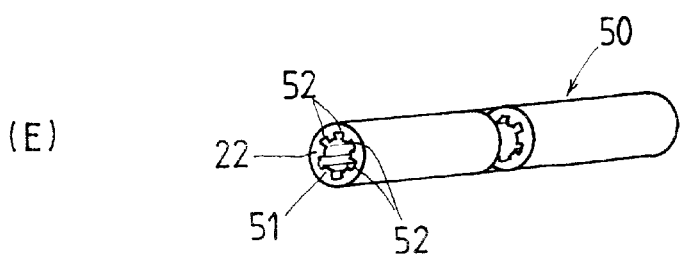

The fifth construction in which the lengthwise projections between the adjacent slots are arranged circularly around the return passage is applicable to other constructions 30, 31, 33 and 40 shown in FIGS. 4 (A) to (D). Moreover, the corrugated construction of the projections and slots may be made around the outside periphery of the sintered resinous members 31, 33 and 40 slit at 32, 36, 46 and 47, respectively, as shown in FIGS. 4(A) to (D).

Figure 5:
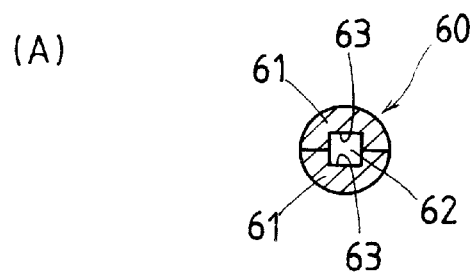
Figure 5:
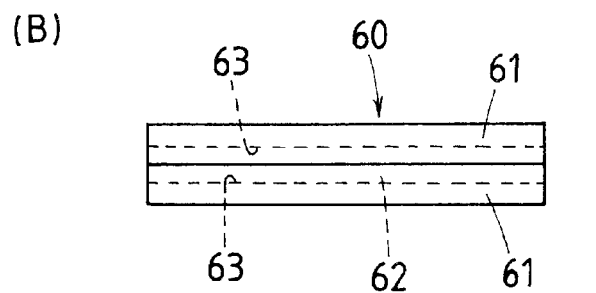

FIG. 5 shows a sintered resinous member 60 used when the rolling elements are rollers. This sintered resinous member 60 in FIG. 5 is comprised of a pair of halves 61, which are identical in cross section with one another and have recesses of rectangle in cross section on the confronting surfaces of them. To make the sleeve construction of the sintered resinous member 60 to be inserted into the bore 26 in the casing 10 in FIGS. 1 to 3, the halves 61 are coupled with each other with their confronting surfaces coming into abutting with one another to form a return passage 62 of rectangular shape in traverse section.

Figure 6:
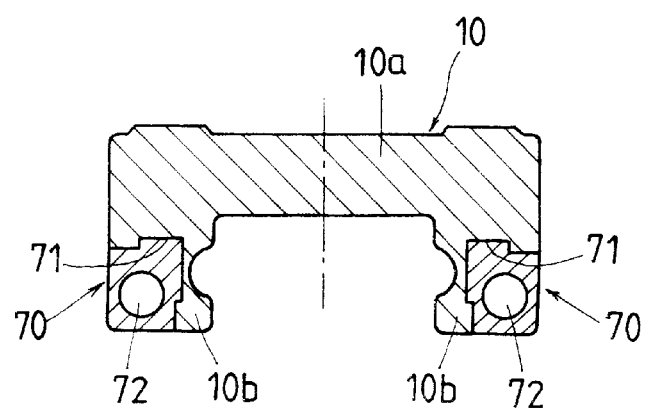
FIG. 6 is a cross section showing a casing of a slider in which modified sintered resinous members are incorporated.

FIG. 6 illustrates a further another construction of the sintered resinous member used in the linear motion guide unit. In the construction in FIG. 6, a sintered resinous member 70 of porous texture is formed in an elongated block made therein a return passage 72, rather than in the form of the sleeve in the constructions stated earlier. The sintered resinous member 70 is especially designed to come to play in itself a part of the casing 10 of the slider 2. Integration of the sintered resinous member 70 with the casing 10 is performed using a complementary undercut 71 made in the casing 10. As a result, the sintered resinous members 70 fit in legs 10b extending at widthwise opposing ends of a major portion 10a of the casing 10 to complete the casing 10 itself. The block-like construction is massive in thickness, and therefore as opposed to the sleeve constructions thin in thickness, makes it possible to accumulate therein an enough amount of lubricant. When the casing 10, for example at the legs 10b, is short of strength, it is preferred to reinforce the casing 10 with a covering member to enhance the strength.

Figure 7:
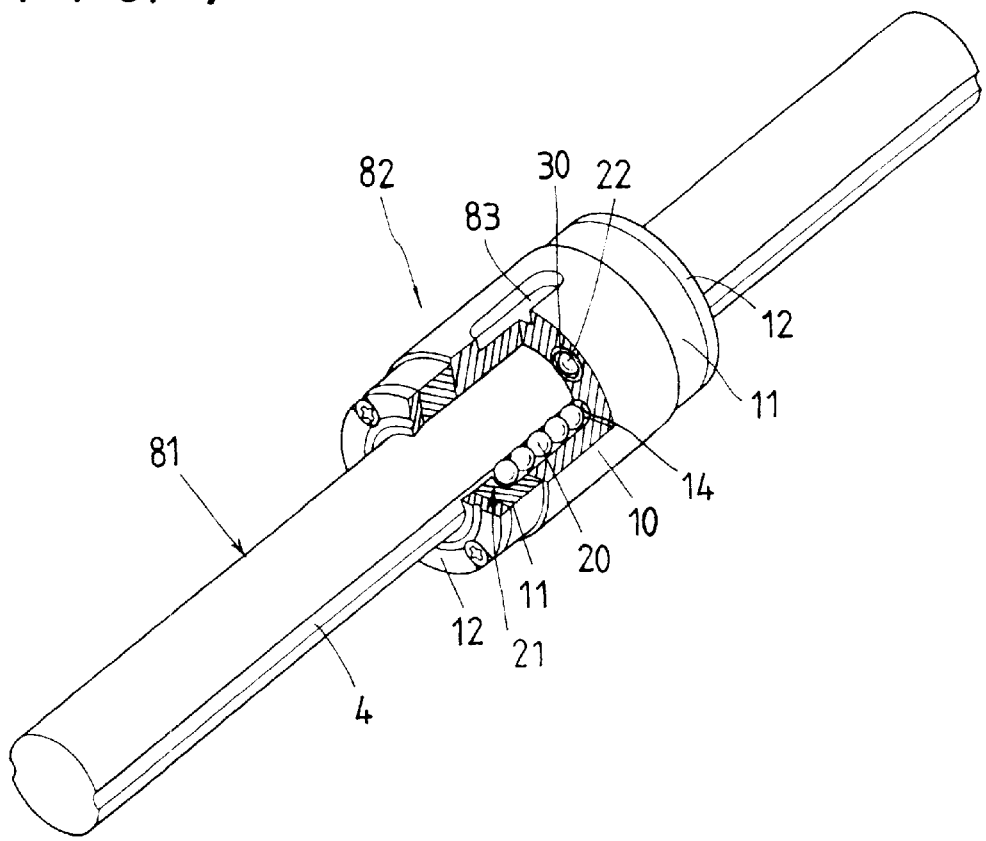
FIG. 7 is a perspective view, partially broken away, showing a recirculating-ball spline in which the linear motion guide unit of the present invention is incorporated.
Figure 8:
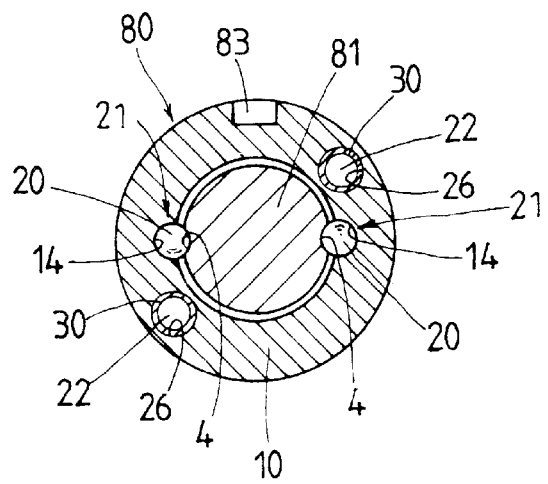
FIG. 8 is a traverse cross section of the linear motion guide unit in FIG. 7.
Figure 9:
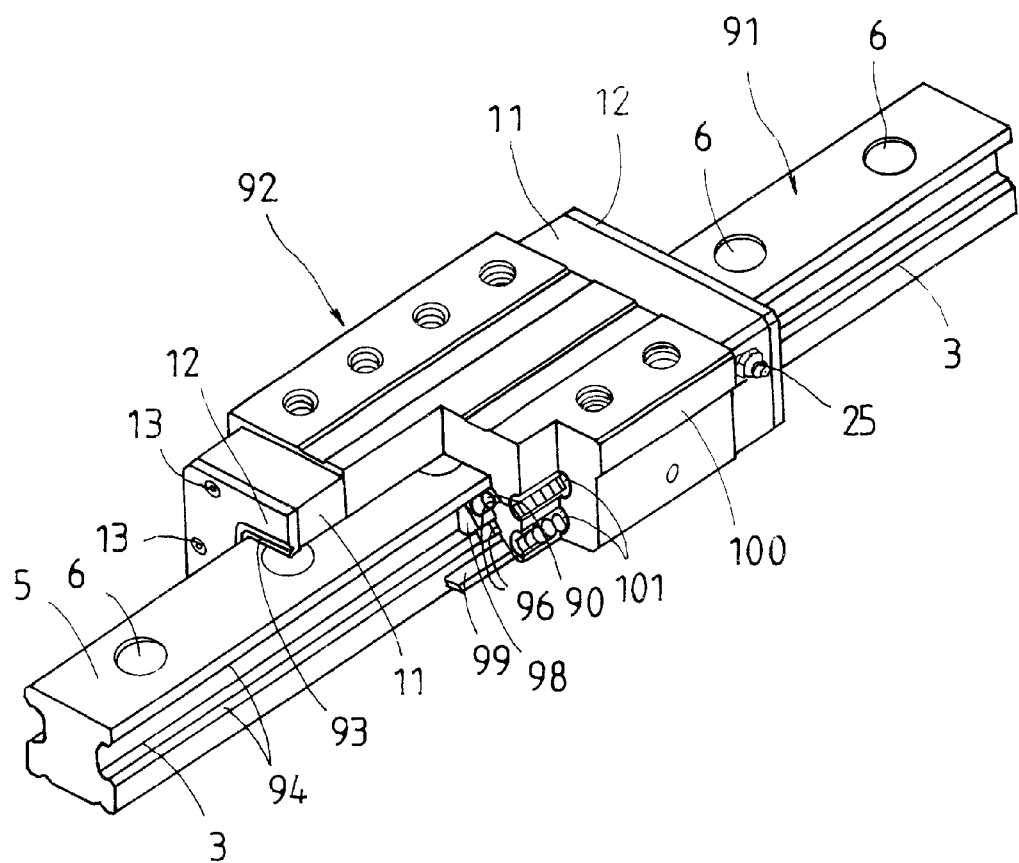
FIG. 9 is a perspective view, partially broken away, showing another embodiment of the linear motion guide unit according to the present invention.
Figure 10:
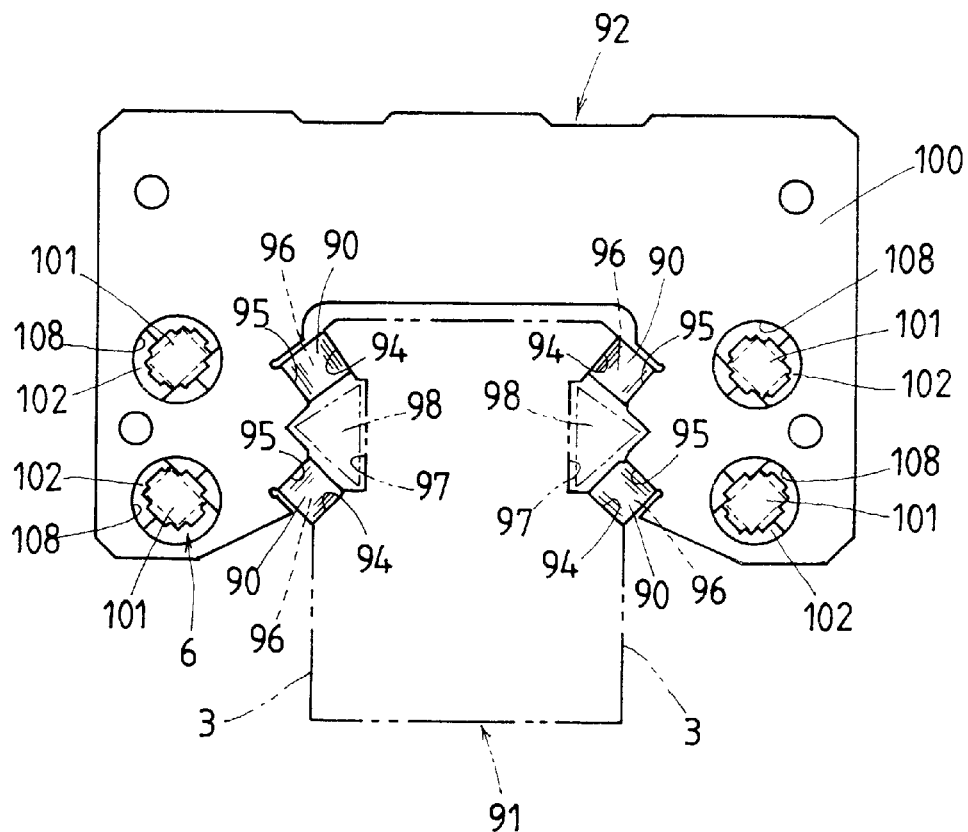
FIG. 10 is an end elevation showing a slider, with an end cap being removed, in the linear motion guide unit in FIG. 9.
Figure 11:
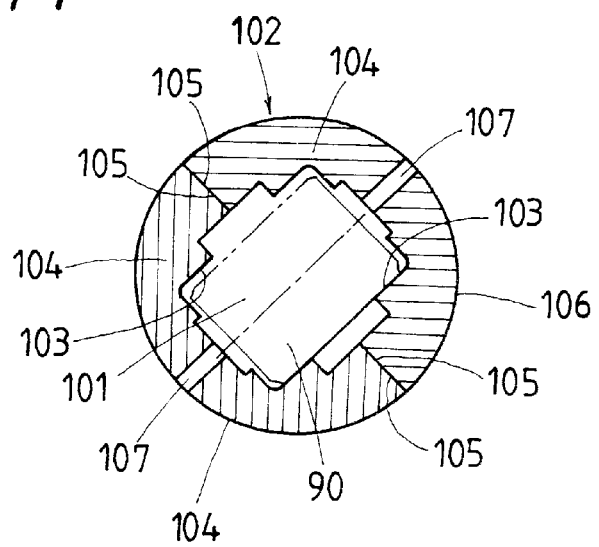
FIG. 11 is a cross section showing a return passage in the linear motion guide unit shown in FIG. 9, which is made with sintered resinous halves abutted together.
Figure 12:
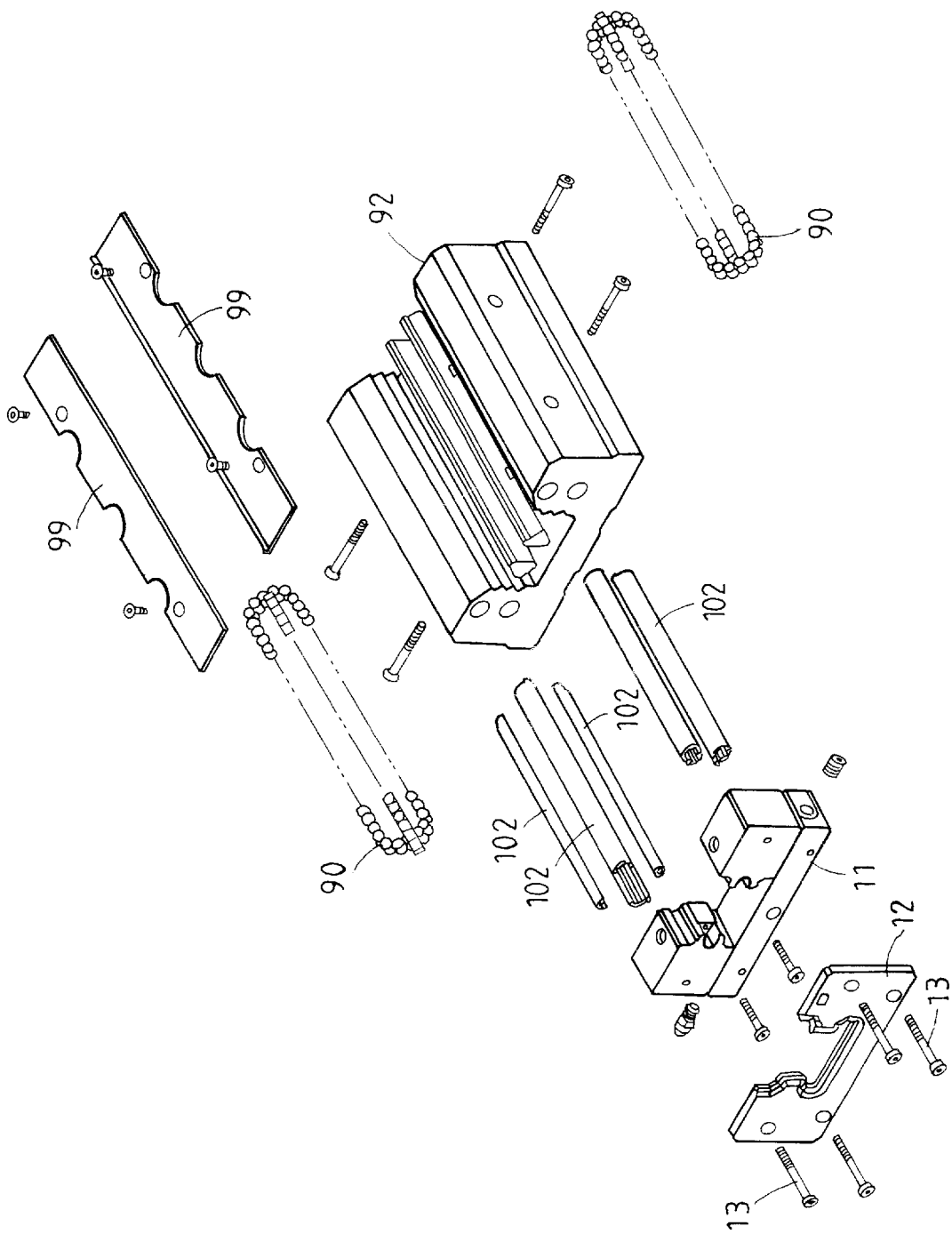
FIG. 12 is an exploded perspective view of the linear motion guide unit in FIG. 9.

Next, FIGS. 7 and 8 show another embodiment of the linear motion guide unit according to the present invention. Compared with the first construction in FIGS. 1 to 3 explained earlier, this alternate construction is different in function and effect from the first construction in FIGS. 1 to 3 only to the extent that the present invention is adapted to a recirculating-ball spline comprised of a track shaft 81 of round in cross section and a cylindrical slider 82 fitting around the track shaft 81 for sliding movement, rather than the combination of the track rail 1 of rectangle in cross section and the slider 2 fitting astride over the track rail 1. Most of the components of the alternate construction are the same in function as previously described regarding the linear motion guide unit in FIGS. 1 to 3. To that extent, like parts and like components have been given the same reference characters, so that the previous description will be applicable. A cylindrical slider 82 is provided therein with an axial bore 26 in which the sintered resinous member 30 of sleeve construction fits to form the return passage 22 surrounded with the sintered resinous member 30. In addition, the slider 82 is made on the outside periphery thereof with a key way, which is used for mount of the movable table.

Finally, FIGS. 9 to 12 show another embodiment of the linear motion guide unit according to the present invention. The linear motion guide unit in FIGS. 9 to 12 is different in construction from the first embodiment shown in FIGS. 1 to 3 only to the extent that the recirculating-rolling elements to move a slider 92 with respect to a track rail 91 are rollers 90 rather than the balls 20. Both the embodiments are substantially identical with each other in basic construction and effect, except the construction relating to having changed the type of the rolling elements. Thus, most of the components and parts are the same as described previously in FIGS. 1 to 3. To that extent, the components and parts are given the same characters, so that the previous explanation will be applicable. To cope with having selected the rollers 90 as the rolling elements, the track rail 91 is made on the lengthwise sides 3 thereof with two raceway flat surfaces, or first raceway surfaces 94, which are arranged divergent with a preselected angle. The slider 92 is provided with two raceway flat surfaces, or second raceway flat surfaces 95 confronting the first raceway flat surfaces 94 to define two-row raceways 96 to provide two load areas extending lengthwise in parallel with each other, where the rollers 90 are allowed to run through them.

Separator plates 98 to keep the rollers 90 in place are installed between the load raceways 96 arranged spaced apart from one another depth-wise of the track rail 91 in the casing 100 of the slider 92. It is to be noted that the separator plates 98 are allowed to move with keeping a small clearance apart from the roots 97 of sidewise recesses on the track rail 91. Moreover, bottom seals 99 extending lengthwise of the slider are attached to lower surfaces of the end caps 11 and casing 100 to cover the clearances between them and the lengthwise sides of the track rail 91. Lips 93 attached to the end seals 12 are to seal the clearances between the slider 92 and the top 5 of the track rail 91.

The casing 100 of the slider 92 is provided therein with return passages 101 extending lengthwise in parallel with the associated raceway flat surfaces 95, while the end caps 11 are made therein with turnarounds to transfer the rollers 90 from the raceways 96 to the associated return passages 101. Thus, the roller 90 are allowed to run through a recirculating route from the load raceway 96 to a non-loaded area, which is comprised of the turnarounds formed in the end caps 11 and the return passage 101 bored in the casing 100. In order to realize the maintenance free of lubrication, the return passage 101 where the rollers 90 run through there is made of a sintered resinous member 102 of porous texture capable of holding the lubricant therein, which is made in the form of a tube extending through the overall length of bore 108 in the casing 100.

The sintered resinous member 102 is composed of lengthwise halves 104, which are abutted against each other at opposing races 103 coming to making line contact with the rollers 90. It is preferred to butt the halves 104 against each other so as to make interdigitated joints, not shown. The lengthwise halves 104 united precisely together with butt joints forms inside the return passage 101 while outside round periphery 106 conforming snugly with the bore 108 in the casing 100. As the lengthwise halves 104 united together are allowed to come in tight contact and/or space apart away from each other at their butt joints 105, the return passage 101 can experience elastic deformation. Although not shown, the lengthwise halves 104 are chamfered at forward and aft ends thereof to provide rounded smooth areas where the rollers 90 are allowed to transfer to the turnarounds with ease.

For making the elastic deformation of the lengthwise halves 104 much easier, the halves 104 are each provided therein with a lengthwise slit 107, which is placed in alignment with loci of axes of the rollers 90. Formation of the slits 107 allows the lubricant to come in and out the sleeve construction of the sintered resinous member 102 at the slits 107. As the lubricant is held in clearances between the sintered resinous member 102 and the return passage 101, the lubricant existing in the slits 107 is absorbed in the sintered resinous member 102 to lubricate over a prolonged period the rollers 90 running through the return passage 101.

All the sintered resinous members 30, 31, 33, 40, 50, 60 and 102 of porous texture are made of sintered porous polymer, which is produced by filling a preselected mould with powdery ultrahigh molecular weight synthetic resin, and then heating the molded resin under high pressure. The powdery synthetic resin used may be selected from polyethylene, polypropylene, tetrafluoroethylene polymer, and so on. The powdery ultrahigh molecular weight polyethylene is a material preferable for producing the molded article with high accuracy and further the resultant sintered resinous components are superior in wear proof. Thus, the sintered resinous member stated earlier has no need of reinforcing members. Moreover, the sintered resinous member used in the present invention, as being less subjected to wear, is tough to clogging, which might be caused by cuttings, debris, and so on occurring due to wear, thereby to make it possible to continue applying over a prolonged period the lubricant to the rolling elements, which convey ultimately the lubricant to the load raceways. The sintered resinous member, as stated earlier, can be easily fabricated in the sleeve construction in which a pair of halves is united together with accuracy. Alternatively, the sintered resinous member may be formed in a sheet, then followed by rolling in the form of sleeve.

The grading of powdery ultrahigh molecular weight polyethylene resin used is, for example, 30 $\mu$m in fine grain size, and from 250 $\mu$m to 300 $\mu$m in coarse grain size, while the porous texture in the sintered resinous member includes therein continuous voids of the porosity of, for example, from 40% to 50%. Dipping the sintered resinous member into, for example, turbine oil for about 30 minutes carries out absorption of lubricating oil into the porous texture. In this case, the sintered resinous member comes to contain therein the lubricating oil content of 41% by weight. Upon immersion in grease for 2 days, the oil content of about 70% of the above 41% by weight is absorbed.

What is claimed is:

1. A linear motion guide unit comprising: an elongated guide member provided with a first lengthwise raceway groove; a slider movable lengthwise along the guide member, said slider being composed of a casing having fore and aft ends and two end caps each attached to a respective one of said ends, said casing being provided with a second raceway groove in confronting relation to said first raceway groove to define a load raceway between said first and second raceway grooves, said casing being provided with a lengthwise bore defining a return passage that extends between said fore and aft ends, and each of said end caps being provided with a turnaround that extends between said load raceway and said return passage, wherein said load raceway, said return passage and said turnarounds form a closed recirculating route;

rolling elements allowed to run through said recirculating route;

a sleeve having forward and aft ends and composed of a sintered resinous member having a porous texture disposed in said lengthwise bore to encircle said return passage, said member being able to be filled with lubricant, wherein:

said lengthwise bore in said casing is made enough in diameter to allow said sleeve to lie therein, while said end caps bear against said forward and aft ends of said sleeve to prevent lengthwise displacement of said sleeve relative to said casing, said sintered resinous member is produced by filling a preselected mold with powdery ultrahigh molecular weight synthetic resin, and then heating the molded resin under high pressure; and the powdery synthetic resin is composed of at least one substance selected from polyethylene, polypropylene and tetrafluoroethylene polymer.

2. A linear motion guide unit constructed as defined in claim 1, wherein the sleeve is made by rolling up a sheet of the sintered resinous member.

3. A linear motion guide unit constructed as defined in claim 1, wherein the sleeve is made of a pair of halves of the sintered resinous member, which are matched together with each other.

4. A linear motion guide unit constructed as defined in claim 1, wherein the sintered resinous member defining the return passage is provided therein with a lubricant reservoir having any shape selected from a recess, a slit and a groove.

5. A linear motion guide unit constructed as defined in claim 1, wherein the guide member is a track rail made on lengthwise sides thereof with first raceway grooves to provide the load raceways, and the slider is formed so as to fit astride over and conform to the track rail for movement relatively of the track rail.

6. A linear motion guide unit constructed as defined in claim 1, wherein the guide member is a track rail provided on radially opposing sides thereof with two lengthwise first raceway grooves, and the slider is formed in a hollow cylinder.

7. A linear motion guide unit constructed as defined in claim 6, wherein the rolling elements are balls.

8. A linear motion guide unit constructed as defined in claim 1, wherein the rolling elements are balls.

* * * * *